United States Patent
Harrell

(10) Patent No.: US 6,406,046 B1
(45) Date of Patent: Jun. 18, 2002

(54) BICYCLE PASSENGER CARRIER

(76) Inventor: Vernon Harrell, 3538 Ireland Dr., Hope Mills, NC (US) 28348

( * ) Notice: Subject to any disclaimer, the term of this patent is extended or adjusted under 35 U.S.C. 154(b) by 91 days.

(21) Appl. No.: 09/656,349

(22) Filed: Sep. 6, 2000

(51) Int. Cl.[7] .................................................. B62J 7/00
(52) U.S. Cl. ...................... 280/202; 280/291; 224/415
(58) Field of Search .............................. 280/202, 288.4, 280/304.4, 304.3, 291; 224/412, 413, 415, 416, 419; 74/554; 297/423.39, 423.4

(56) References Cited

U.S. PATENT DOCUMENTS

| | | | | |
|---|---|---|---|---|
| 563,526 A | * | 7/1896 | Whitney ...................... 280/202 |
| 1,037,216 A | * | 9/1912 | Young, Jr. .................. 280/202 |
| 1,181,796 A | * | 5/1916 | Pendleton ................... 280/202 |
| 1,317,378 A | | 9/1919 | McEnroe |
| 1,469,742 A | * | 10/1923 | Vetter ......................... 280/202 |
| 1,709,538 A | * | 4/1929 | Persons ....................... 280/202 |
| 1,717,056 A | | 6/1929 | Mesinger |
| 2,126,752 A | * | 8/1938 | Devine et al. ........... 280/304.3 |
| 2,320,344 A | * | 6/1943 | Belanger .................... 280/202 |
| 2,517,957 A | | 8/1950 | Anderson |
| 3,288,490 A | | 11/1966 | Jensen |
| 3,746,392 A | * | 7/1973 | German ....................... 297/380 |
| 4,050,615 A | * | 9/1977 | Kline ........................... 224/32 |
| 4,085,968 A | * | 4/1978 | Svensson et al. ............ 297/243 |
| 4,809,563 A | * | 3/1989 | Loppnow ................... 74/534.6 |
| 4,932,572 A | * | 6/1990 | Ippolito et al. ............... 224/32 |
| 5,154,096 A | | 10/1992 | Geller et al. |
| 5,285,935 A | | 2/1994 | Hsueh |
| 5,340,003 A | | 8/1994 | Wilson |
| 5,423,462 A | * | 6/1995 | Dickhaus ...................... 224/31 |
| 5,622,374 A | * | 4/1997 | Rudeen et al. .............. 280/202 |
| 5,810,229 A | | 9/1998 | Harrell |

FOREIGN PATENT DOCUMENTS

JP       0909527    *  4/1997

* cited by examiner

*Primary Examiner*—Brian L. Johnson
*Assistant Examiner*—Daniel Yeagley

(57) ABSTRACT

A passenger carrier for a bicycle is mounted behind the bicycle seat to the bicycle frame. The preferred passenger carrier includes in the preferred form a pair of vertical C-shaped footrests for convenience and comfort by passengers of different heights. A passenger seat and backrest can also be attached to the passenger carrier and a storage compartment is also available beneath the passenger seat.

12 Claims, 7 Drawing Sheets

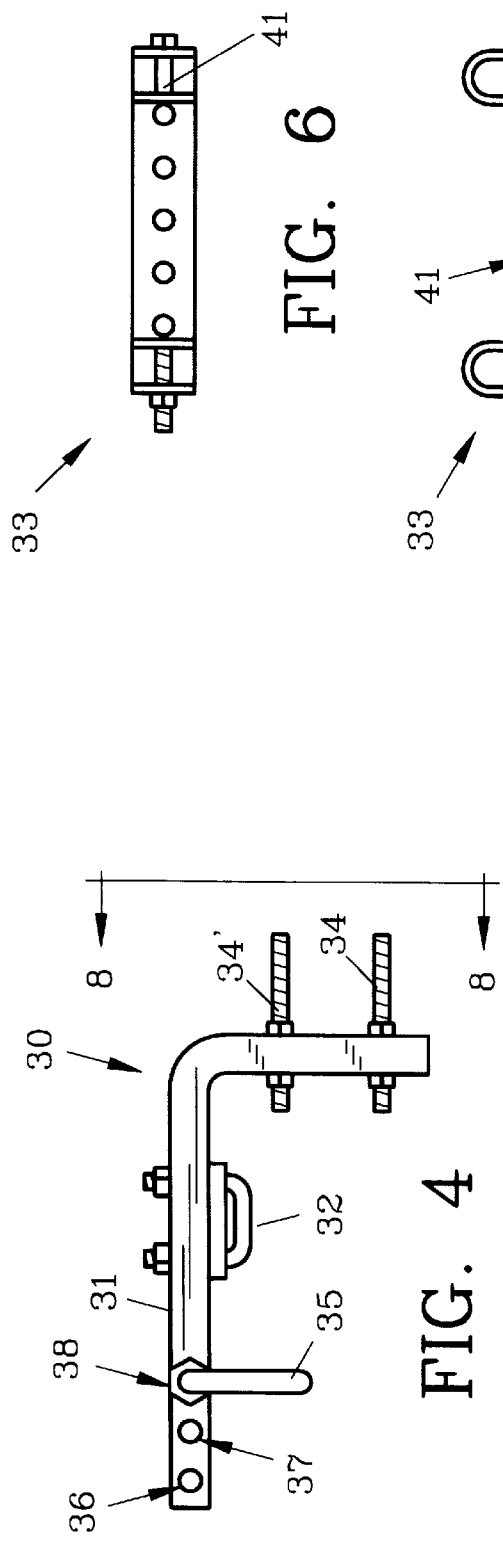

BICYCLE PASSENGER CARRIER

FIELD OF THE INVENTION

The invention herein pertains to bicycles and particularly pertains to a passenger carrier for positioning behind the bicycle seat to allow a passenger to stand or sit over the rear wheel.

DESCRIPTION OF THE PRIOR ART AND OBJECTIVES OF THE INVENTION

It is common to carry passengers on bicycles in either a standing or sitting position. U.S. Pat. No. 5,810,229 demonstrates a standing passenger carrier, while U.S. Pat. No. 5,285,935 demonstrates a typical luggage or child carrier positioned over the rear wheel of a bicycle. While each of these prior art devices are beneficial, there has existed a need for a carrier to allow a passenger to either sit or stand as desired behind the conventional bicycle seat. Also, the passengers, seated or standing should be comfortable and secure. There is also a need for such a carrier to be easily assembled and mounted or disassembled and removed as needed.

Thus, with the shortcomings and disadvantages of present bicycle passenger carriers, the present invention was conceived and one of its objectives is to provide a carrier which includes a handle, legs and footrests to accommodate passengers.

It is yet another objective of the present invention to provide a passenger carrier which can be easily mounted or removed from a conventional bicycle using simple hand tools.

It is a further objective of the present invention to provide a passenger carrier which will allow the passenger to stand or sit in comfort as desired.

It is a further objective of the present invention to provide a passenger seat and storage compartment for carrying miscellaneous items which can be easily accessed from under the passenger seat.

It is still a further objective of the present invention to provide a backrest which can be easily affixed to the passenger seat for additional passenger comfort.

Various other objectives and advantages of the present invention will become apparent to those skilled in the art as a more detailed description is set forth below.

SUMMARY OF THE INVENTION

A bicycle passenger carrier attachment is provided formed from tubular metal such as aluminum or steel which includes a U-shaped handle having depending legs. C-shaped foot rests are affixed to the terminal ends of the legs to provide, in the preferred form, multiple steps for selection by sitting passengers of different heights. Polymeric tubular foam covers portions of the metal carrier which is integrally formed for increased friction and better gripping. A stabilizer is affixed to the depending legs and to the bicycle frame to support the carrier and to allow the front of the bicycle seat to rest thereon for stability purposes. A tubular seat frame is affixed to the passenger carrier legs which encloses a compartment with a hinged upper seat. Another tubular member forms a back rest and is affixed to the seat frame. Another embodiment of the passenger carrier provides horizontal C-shaped footrests for standing passengers.

BRIEF DESCRIPTION OF THE DRAWINGS

FIG. 4 shows a top view of the stabilizer as seen in FIG. 2 removed from the bicycle;

FIG. 5 demonstrates a top view of the stabilizer bracket removed from the stabilizer;

FIG. 6 features a view of the stabilizer bracket as seen along lines 6—6 of FIG. 5;

FIG. 7 pictures a side view of the stabilizer as shown in FIG. 2 without the bracket attached;

FIG. 8 illustrates a rear view of the stabilizer as shown along lines 8—8 of FIG. 4;

DETAILED DESCRIPTION OF THE PREFERRED EMBODIMENT AND OPERATION OF THE INVENTION

Figure 1:
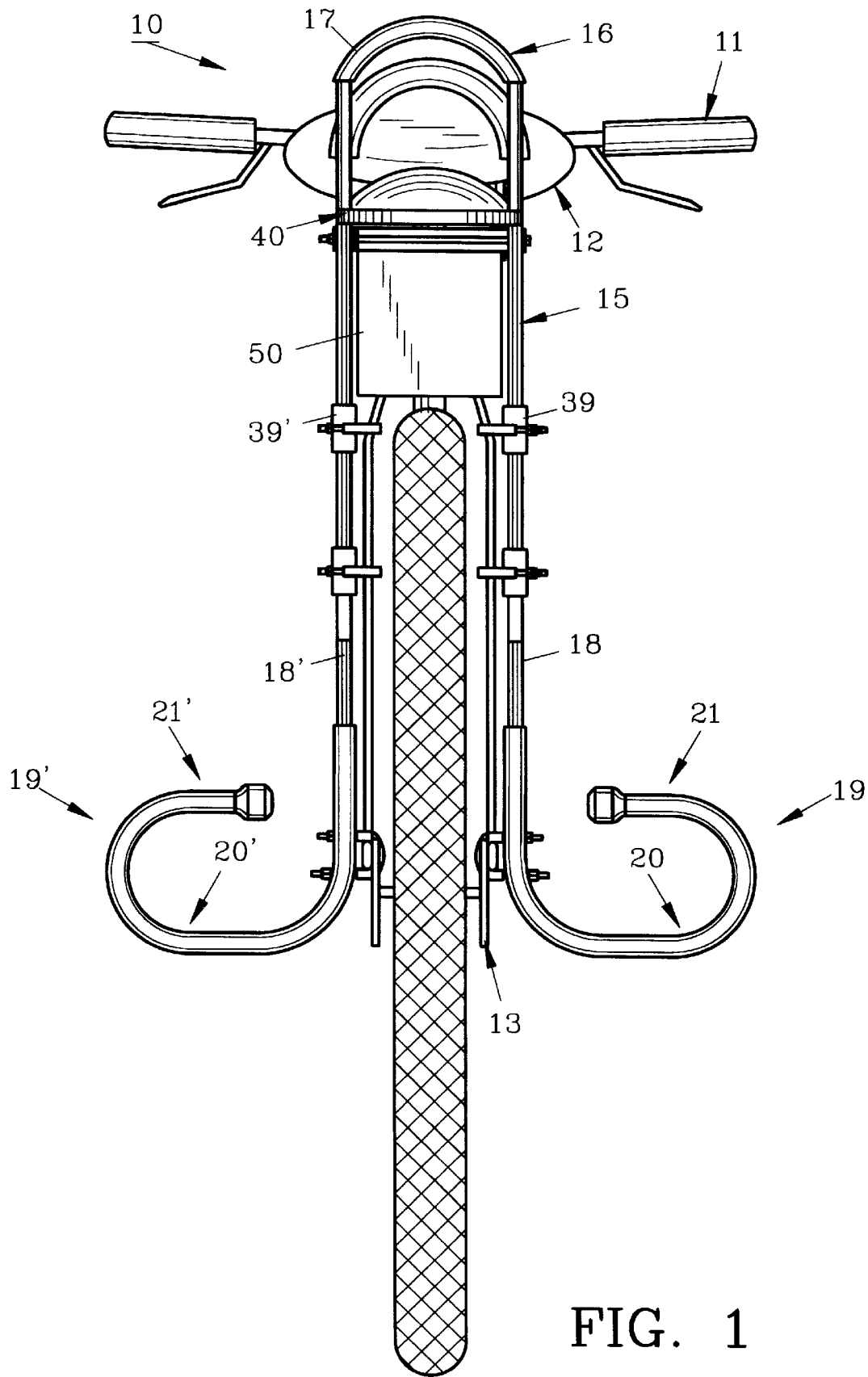
FIG. 1 illustrates a rear view of a typical bicycle with the passenger carrier of the invention mounted thereon.
Figure 2:
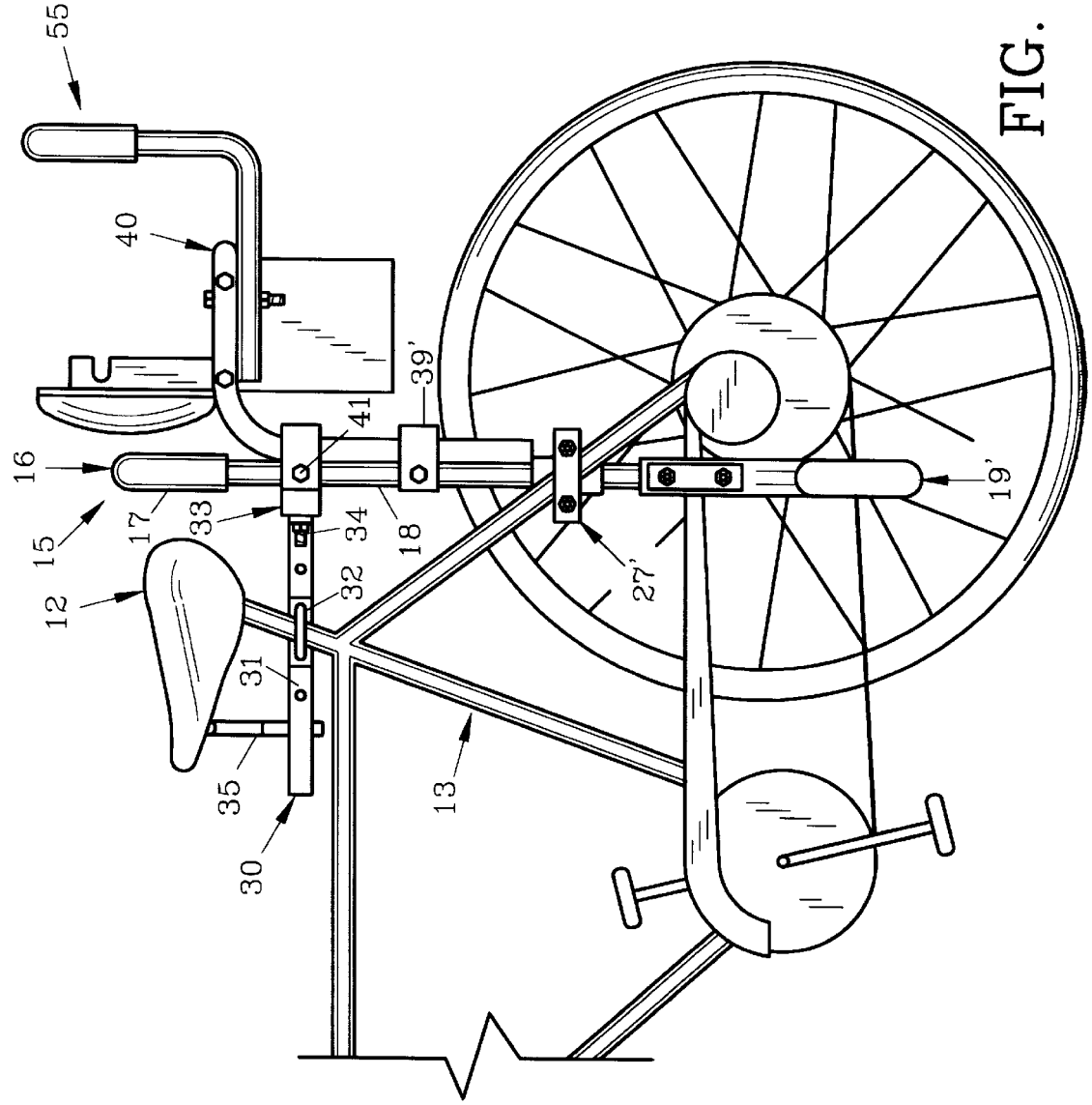
FIG. 2 shows a partial side view of the bicycle as seen in FIG. 1 with the passenger carrier.

For a better understanding of the invention and its operation, turning now to the drawings, FIG. 1 shows in schematic fashion a rear view of conventional bicycle 10 having handlebars 11 and seat 12 joined to bicycle frame 13. Attached thereto is preferred passenger carrier 15 which includes inverted U-shaped handle 16 covered with a resilient polymeric foam material 17, legs 18, 18' and footrest 19, 19'. Legs 18, 18' as seen in FIG. 2 are affixed to U-shaped handle 16 such as by being integrally formed therewith from tubular metal. Affixed to legs 18, 18' also by integrally forming are footrests 19, 19' which are C-shaped to provide lower steps 20, 20' and upper steps 21, 21'. Steps 20, 20' and 21, 21' allow for passengers of different heights to comfortably position themselves on passenger carrier 15 while sitting. As such, shorter passengers would utilize steps 21, 21' whereas taller passengers would utilize steps 20, 20' as desired.

Figure 3:
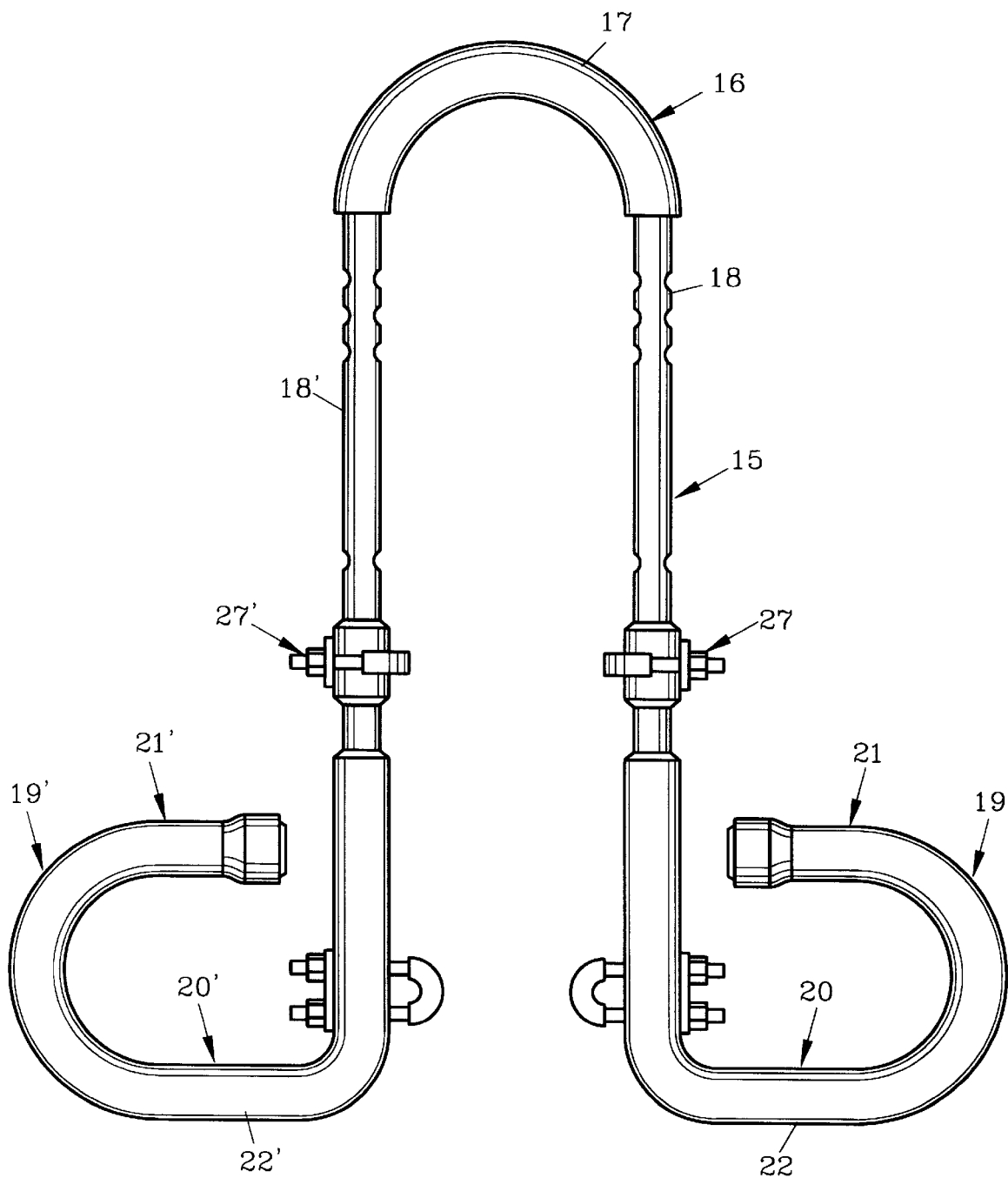
FIG. 3 depicts an enlarged view of the passenger carrier as shown in FIG. 1 without the seat and back rest as removed from the bicycle.

In FIG. 3, passenger carrier 15 is shown removed from bicycle 10 with foam polymeric members 22, 22' attached for increased friction and tripping purposes. Polymeric member 22, 22' are tubular and flexible to conform to vertical C-shaped footrests 19, 19'. Also, U-shaped clamps 27, 27' are seen with cylindrical scratch preventive members to affix passenger carrier 15 to bicycle frame 13 (FIGS. 1 and 2).

L-shaped stabilizer 30 as shown in FIGS. 4 and 7 includes metal horizontal member 31, C-shaped clamp 32 for joining stabilizer 30 to bicycle frame 13 and bracket 33 as shown in FIGS. 5 and 6 which is joined by threaded members 34, 34' to horizontal member 31. Threaded member 41 extends through bracket 33 as seen in FIGS. 5 and 6 and is tightenable to secure stabilizer 30 to carrier 15 as shown in FIG.

2. Horizontal member 31 includes bicycle seat support 35 also shown in FIG. 8 which is adjustably positionable in either of apertures 36, 37 or 38 as seen in FIG. 4. Support 35 assists in preventing bicycle seat 12 from tilting due to the stresses occurring when a passenger is carried on bicycle 10.

Figure 9:
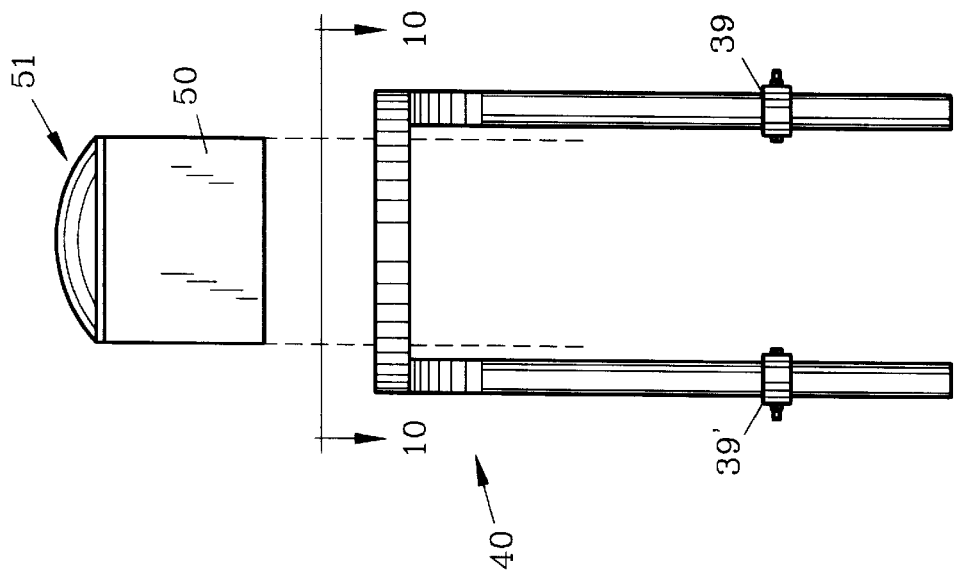
FIG. 9 shows the tubular seat frame as seen in FIG. 2 but with the passenger seat and storage compartment exploded therefrom and as removed from the bicycle.
Figure 11:
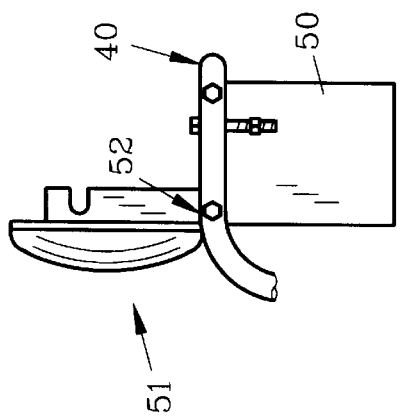
FIG. 11 depicts a side view of the storage compartment and passenger seat with the passenger seat opened.
Figure 10:
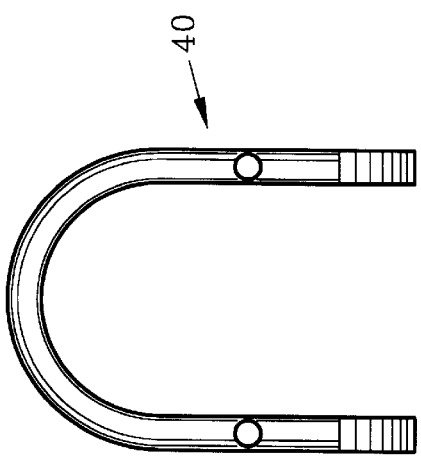
FIG. 10 demonstrates a top view of the seat frame as shown in FIG. 9 along lines 10—10.

As further shown in FIGS. 1, 2 and 10, tubular seat frame 40 is attached to carrier legs 18, 18' by stabilizer bracket 33 and U-shaped clamps 39, 39', also shown in FIG. 9. Tubular seat frame 40 receives storage compartment 50 therein (FIG. 9) with seat 51 positioned thereon. Seat 51 as seen in FIG. 11 is hingedly attached to compartment 50 by axle bolt 52. Seat 51 can be opened (FIGS. 2 and 11) to expose storage compartment 50 which may be formed from plastic or closed (FIGS. 1 and 9) for sitting thereon while riding.

Figure 12:
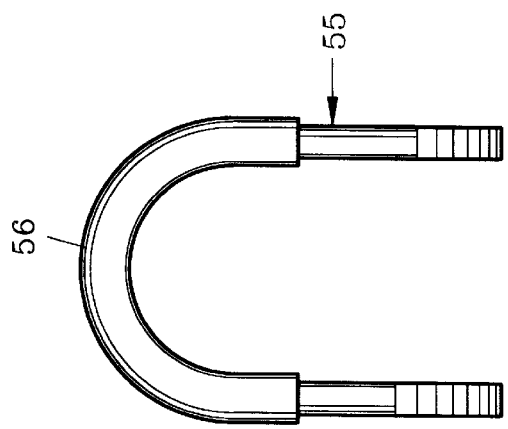
FIG. 12 illustrates a front view of the back rest as removed from the bicycle.

For additional comfort while on seat 51, passenger back support 55 as illustrated in FIGS. 2 and 12 is partially covered by polymeric foam 56. Back support 55 is attached to seat frame 40 by bolts or other fasteners.

Figure 13:
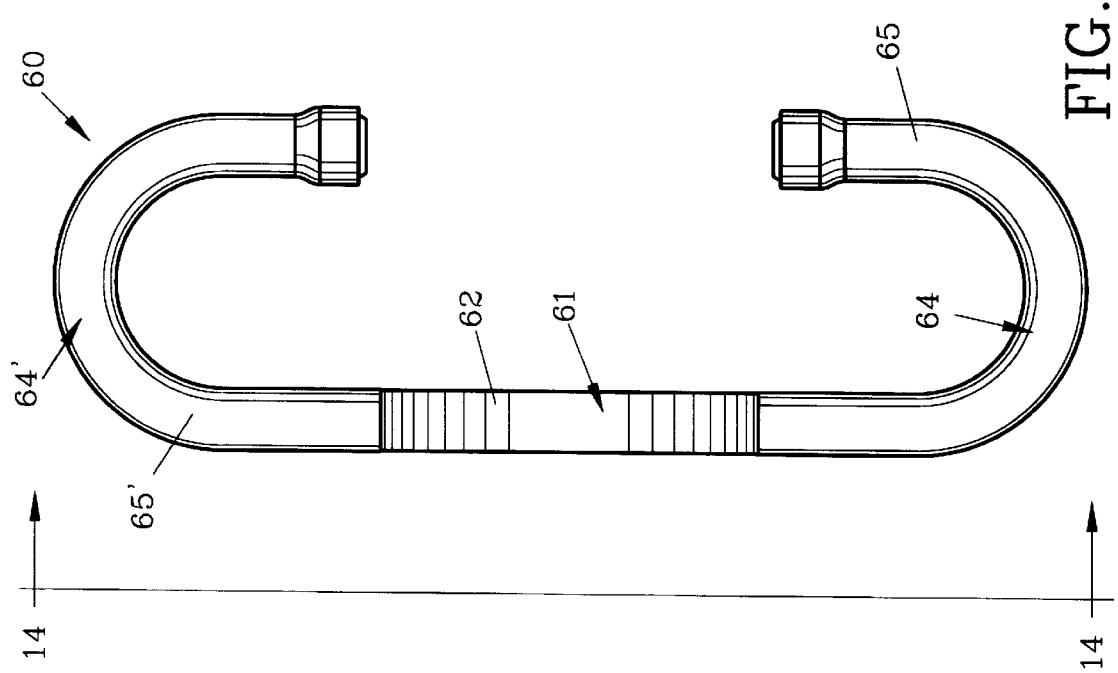
FIG. 13 shows a top view of an alternate embodiment of the bicycle carrier as used for standing passengers.
Figure 14:
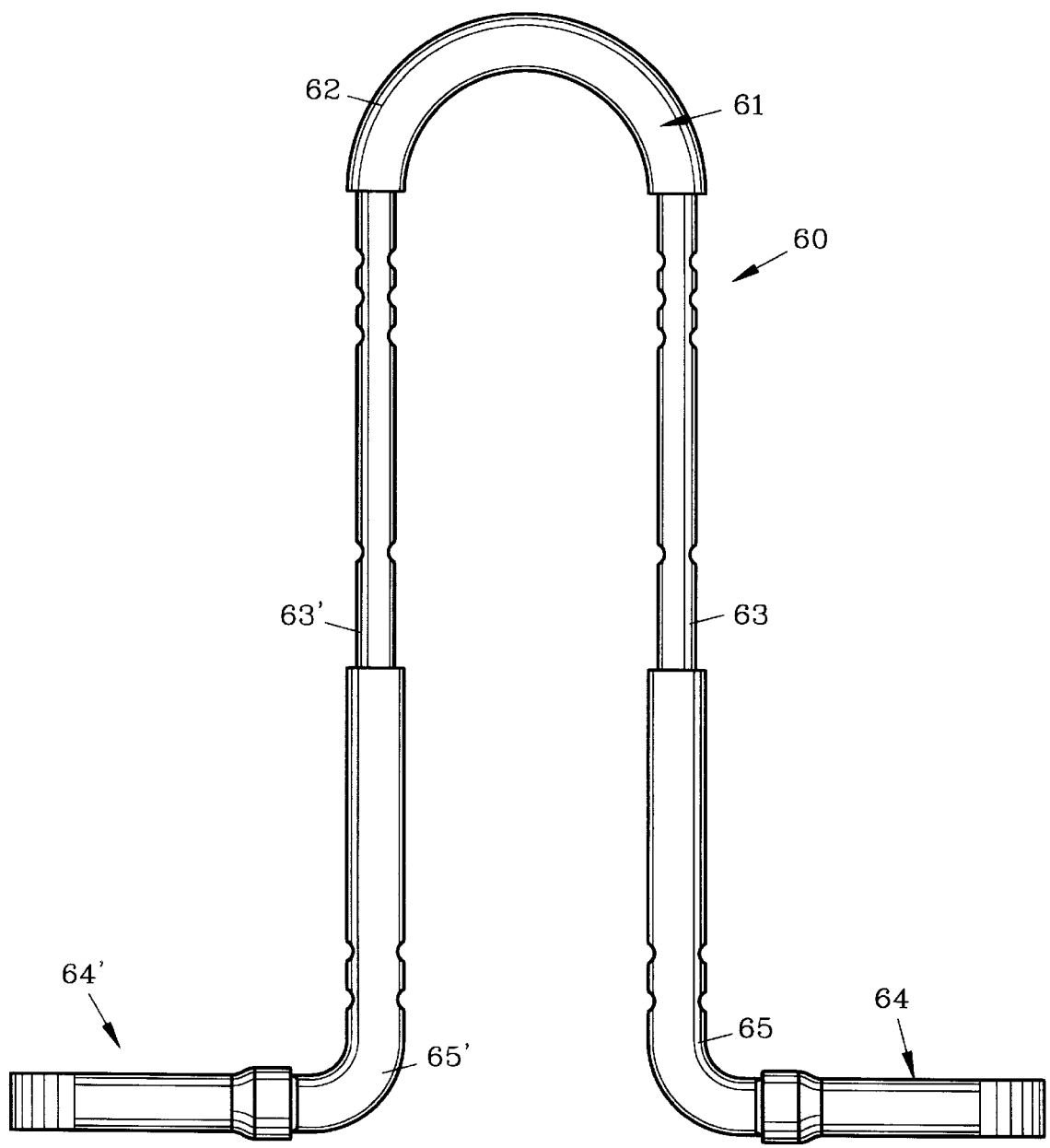
FIG. 14 depicts a view of the alternate passenger carrier embodiment as seen in FIG. 13 along lines 14—14.

An alternative passenger carrier 60 used for standing without a seat or backrest is seen in FIGS. 13 and 14. Carrier 60 includes handle 61 covered with polymeric foam 62, legs 63, 63' and horizontal C-shaped footrests 64, 64' also covered with tubular polymer foam 65, 65' for frictional purposes. Footrests 64, 64' have a distal end and a proximal end, the proximal ends of the footrests 64, 64' are affixed to legs 18, 18'. The footrests 64, 64' extend outwardly in a transverse direction from a longitudinal direction of the frame 13 and lie in a horizontal plane and curve in a C-shape direction in the horizontal plane back toward the frame 13 creating an open center footrest and provide a relatively wide step for use while standing.

The illustrations and examples provided herein are for explanatory purposes and are not intended to limit the scope of the appended claims.

I claim:

1. A passenger carrier for mounting behind the seat of a bicycle comprising:
    a) an inverted U-shaped handle;
    b) a pair of legs, said legs depending downwardly from said U-shaped handle on opposite sides thereof;
    c) a pair of vertical C-shaped footrests, each of said pair of C-shaped footrests attached to different ones of said legs; and
    d) each of said C-shaped footrests forming an upper and a lower step.

2. The carrier of claim 1 further comprising a carrier seat frame, said carrier seat frame affixed to said U-shaped handle.

3. The carrier of claim 2 further comprising a carrier seat, said carrier seat attached to said carrier seat frame.

4. The carrier of claim 3 further comprising a storage compartment, said seat hingedly affixed to said storage compartment.

5. The carrier of claim 2 further comprising a back rest, said back rest attached to said carrier seat frame.

6. The carrier of claim 1 further comprising a stabilizer, said stabilizer affixed to said U-shaped handle proximate the bicycle seat.

7. A passenger carrier for mounting behind a bicycle seat attached to a bicycle frame comprising:
    a) a U-shaped handle, said U-shaped handle attached to said bicycle frame;
    b) a pair of legs, said legs depending downwardly from said U-shaped handle on opposite sides thereof;
    c) a pair of horizontal C-shaped footrests having a distal end and a proximal end, each of said C-shaped footrests attached to said proximal end of said footrest to different ones of said legs, each of said C-shaped footrest extend outwardly in a transverse direction from a longitudinal direction of the frame and lie in a horizontal plane, the footrests curve in a C-shape direction in the horizontal plane back toward said frame creating an open center footrest forming a relatively wide step for standing passengers.

8. The passenger carrier of claim 7 further comprising: a seat frame, said seat frame affixed to said U-shaped handle; a seat, said seat attached to said seat frame, a back rest, said back rest attached to said seat frame, and a storage compartment, said seat hingedly affixed to said storage compartment.

9. The passenger carrier of claim 7 further comprising a stabilizer, said stabilizer attached to said handle and to the bicycle frame.

10. The passenger carrier of claim 7 wherein said seat frame comprises metal tubular member.

11. A passenger carrier for mounting behind the seat of a bicycle comprising:
    a) an inverted U-shaped handle;
    b) a pair of legs, said legs depending downwardly from said U-shaped handle on opposite sides thereof;
    c) a pair of vertical C-shaped footrests, said pair of C-shaped footrests attached to different ones of said legs;
    d) said footrests each forming an upper and a lower step;
    e) said inverted U-shaped handle, said legs and said footrests integrally formed from a metal tube; and
    f) a pair of resilient tubular-members, each of said pair of resilient tubular members covering different ones of said footrests.

12. The passenger carrier of claim 11 further comprising a seat frame, a pair of U-shaped clamps, said seat frame affixed to said pair of legs with said pair of U-shaped clamps.

* * * * *